United States Patent [19]

Amjad

[11] Patent Number: 4,806,259

[45] Date of Patent: Feb. 21, 1989

[54] MEMBRANE CLEANING COMPOSITIONS CONTAINING PHOSPHOROUS COMPOUNDS

[75] Inventor: Zahid Amjad, Avon Lake, Ohio

[73] Assignee: The B. F. Goodrich Company, Akron, Ohio

[21] Appl. No.: 61,936

[22] Filed: Jun. 15, 1987

[51] Int. Cl.$^4$ ............................ C02F 5/08; C02F 5/10; C23F 11/00; C23F 11/10

[52] U.S. Cl. ............................ 252/80; 252/86; 252/87; 252/142; 252/180; 252/181; 210/699; 210/701

[58] Field of Search ............... 252/86, 87, 80, 142, 252/180, 181; 210/699, 701

[56] References Cited

U.S. PATENT DOCUMENTS

| | | | |
|---|---|---|---|
| 3,837,803 | 9/1974 | Carter et al. | 204/13 |
| 4,192,744 | 3/1980 | Clark et al. | 210/54 |
| 4,357,254 | 11/1982 | Kapiloff et al. | 252/181 |
| 4,386,005 | 5/1983 | Kapiloff et al. | |
| 4,496,470 | 1/1985 | Kapiloff et al. | 252/181 |
| 4,510,059 | 4/1985 | Amjad et al. | 210/701 |
| 4,617,129 | 10/1986 | Lees | 210/700 |
| 4,634,532 | 1/1987 | Logan et al. | 210/697 |

FOREIGN PATENT DOCUMENTS 57171485 5/1981 Japan .

OTHER PUBLICATIONS

The Merck Index—1976, #8421 & #8422.

*Primary Examiner*—Paul Lieberman
*Assistant Examiner*—Ronald A. Krasnow
*Attorney, Agent, or Firm*—George A. Kap; Alan A. Csontos

[57] ABSTRACT

This invention pertains to the use of certain phosphorus compounds in conjunction with other materials which characterize cleaners of alkaline earth metal salts, metal oxide/hydroxide salts, and silica/silicate salts, particularly citric acid, malic acid, oxalic acid, ammonium bifluoride and sodium bifluoride. Amount of the phosphorus compounds is 0.5 to 70%, preferably 2 to 40%, based on 100% of a cleaner composition which includes the phosphorus compounds. Suitable phosphorus compounds are selected from aminoalkyl and hydroxyalkyl phosphonic acids and phosphonates, phosphonoalkanepolycarboxylic acids and salts thereof, polyphosphoric acids and salts thereof, and polyol phosphate esters.

19 Claims, No Drawings

MEMBRANE CLEANING COMPOSITIONS CONTAINING PHOSPHOROUS COMPOUNDS

BACKGROUND OF THE INVENTION

Removal of organic and mineral deposits from solid surfaces has been accomplished in the past with limited success. This, of course, includes removal of organic and mineral deposits from semipermeable membranes which are used in reverse osmosis systems to purify water and from ion-selective membranes used in electrodialysis systems.

Osmosis concept is based on the use of a semipermeable membrane which is semipermeable to water but which rejects certain dissolved salts. If pure water is separated from a salt solution by a semipermeable membrane, water will flow through the membrane from the pure water side to the impure water side or from dilute solution side to the more concentrated solution. This results in diluting the more concentrated solution and such process continues until osmotic equilibrium is reached at which point, osmotic pressure or solution concentration on both sides of the membrane is about equal.

It is known, however, that if positive pressure is applied to the salt solution sufficient to overcome the osmotic pressure, the flow will be reversed and water will flow from the salt solution through the membrane to the pure water side. This is what is meant by reverse osmosis. To accomplish this, pressure of 600 to 800 psi is usually applied to the feedwater side in order to reverse the flow of water to the pure water or product water side. Product water is 95 to 99% free of dissolved material. Such pressures are generally used to purify saline water by forcing the water through the membrane which rejects minerals.

Electrodialysis is an electrochemical separation process in which salts that are dissolved in water are forced through ion selective membranes under the influence of an applied electric field. The net result of this dialytic process is the transfer of ions from a less concentrated solution to a more concentrated solution. Electrodialysis reversal is simply an electrodialysis process in which the polarity of the applied direct current potential is automatically reversed at regular 15 to 30 minute intervals. Polarity reversal changes the direction of ion movement within the membrane stack.

Operational limitations on unidirectional membrane processes are imposed by the chemistry of the concentrate or brine stream. Long term, stable system performance is of critical importance for industrial operations and municipal supplies. Membrane fouling and mineral scale formation radically degrade system performance. Typical pretreatment for unidirectional membrane processes includes presoftening or treatment of the feedwater with acid and/or complexing agents such as polyphosphates. Such pretreatment and chemical feed requirements add the burdens of cost and waste treatment to the desalting process.

The semipermeable membranes are generally thin and delicate. They can be supported on spongy or foamed matrix to provide mechanical support for the membrane. Such matrices have open cells which allow passage of water or liquid. Semipermeable membranes are made from any suitable material such as cellulose acetate, cellulose triacetate, a polyamide, or a polysulfone.

The continued efficiency of a reverse osmosis system depends on the maintenance of the membrane in an unfouled condition. Probably the greatest problem experienced in the use of these systems is fouling of the membrane by scale. Typically, the membrane becomes fouled by scale build-up to a point where it must be replaced quite often. The cartridge containing the membrane must be removed and replaced by a clean cartridge. The used cartridge is then treated to remove scale. Obviously, it is desirable to prevent scale build-up or at least, prolong the time between cartridge changes. This is ordinarily done by injecting certain chemical additives to the impure water, which are used for the purpose of preventing the build-up of foulants.

Cleaning of the membrane can be made in place whereby the piping is provided to allow for recirculation of a cleaner solution. In this fashion, valves are manipulated to allow for recirculation of the cleaner solution through the membrane until the membrane is cleaned to the point where it can be returned into a reverse osmosis system. In some commercially operating systems, a membrane cartridge is removed and placed in a cleaner mode where a cleaner solution is recirculated through the membrane in the cartridge until the membrane is sufficiently clean for reuse. In either case, a cleaning solution is prepared which is capable of removing scale and other foulants from the membrane. Also, in some situations, an additive can be added to infeed water to prevent or reduce formation of foulants which, otherwise, would deposit on the membrane and thus clog it.

U.S. Pat. No. 4,357,254 describes various prior art which generally relates to removal of calcium and magnesium scale. That patent itself is directed to compositions for cleaning solid surfaces and reverse osmosis membranes for removal of calcium, magnesium and iron scale. The iron scale is generally iron oxide which is primarily formed by the use of steel pipes or fittings which gradually raise the level of ferrous iron in water. The ferrous iron is then oxidized by dissolved oxygen to form ferric iron which hydrolyzes to ferric oxide or hydroxide which deposits on the membrane. Ferrous ion can also enter via the feedwater.

For cleaning reverse osmosis membranes containing little or no iron scale, U.S. Pat. No. 4,357,254 discloses compositions comprising a monobasic or dibasic sodium phosphate, citric acid, malic acid, and a nonionic surfactant. Citric and/or malic acids are used in amount of at least 20%. That patent also discloses that in reverse osmosis systems where there is a significant amount of iron oxide scale, oxalic acid should also be included. Such compositions are effective for cleaning fouled reverse osmosis membranes by dissolving and dispersing organic and mineral deposits, which primarily are calcium and magnesium scale as well as silicates and colloidal clay.

As is noted in U.S. Pat. No. 4,357,254, the disclosed composition is dissolved in water to a concentration of from about 0.1% by weiqht to about 5% by weight. Any concentration within that range will effectively clean the membrane, the primary effect of varying concentration being in the cleaning time. At a preferred concentration of about 2%, the average system can be cleaned in from ½ to 1 hour at about 25° C. As the concentration goes to the higher end of the range, the saving in cleaning time, due to the kinetics of the system, is not appreciably shortened over the ½ to 1 hour cleaning time at the preferred concentration of 2%. As the concentration goes to the low end of the range, the cleaning time can become inconveniently long. Even at the low end of the range, however, the capacity of the solution is more than adequate to effectively clean the membrane.

By means of another approach, the composition can be injected into the input water to provide 0.01 to 5000 ppm, preferably 0.1 to 50 ppm, for the purpose of maintaining the membrane in a relatively clean condition or to prolong the use of the membrane by keeping it cleaner longer. Pursuant to this approach, membranes are kept in operation for extended periods before they are cleaned or replaced.

U.S. Pat. No. 4,386,005 discloses the synergistic relationship of a low molecular weight polyacrylic acid and phytic acid compositions to reduce build-up of calcium, magnesium, and/or iron scale. In col. 3, this patent discloses pertinent prior art and the unique feature of iron scale which can damage the membrane by growth of crystals within the membrane.

U.S. Pat. No. 4,496,470, which is a c-i-p of U.S. Pat. No. 4,357,254, describes similar semipermeable membrane cleaner compositions as U.S. Pat. No. 4,357,254 but additionally discloses that sulfamic acid can be used in place of or in conjunction with citric acid and/or malic acid, i.e., weak organic acids. Sulfamic acid is also a weak organic acid.

U.S. Pat. No. 4,386,005 describes scale-inhibiting compositions of low molecular weight polyacrylic acids which are effective against calcium and magnesium scale to a point where cleaning of a semipermeable membrane is not necessary for several months. This patent also discloses that phytic acid is at least as effective as low molecular weight polyacrylic acid for inhibiting calcium and magnesium scale build-up on reverse osmosis membranes. Phytic acid is also very effective in inhibiting formation or deposition of iron scale on a reverse osmosis membrane where the feedwater is saline or brackish. Although saline water has a low concentration of iron, brackish water has an extremely high iron concentration.

SUMMARY OF THE INVENTION

This invention pertains to removal of organic and mineral deposits from solid surfaces, such as cleaning of semipermeable membranes used in reverse osmosis systems, using cleaning compositions and to the cleaning compositions themselves. The novel cleaning compositions are the cleaners for alkaline earth metal salts and metal oxides and hydroxides, and the silica and silicate cleaners to which are added one or more phosphorus compounds selected from phosphates and phosphonates in sufficient amount to inhibit precipitation of metal salts of active cleaning ingredients such as calcium fluoride, calcium oxalate, and the like.

DETAILED DESCRIPTION OF THE INVENTION

This invention pertains to the use of a phosphorus compound selected from phosphates and phosphonates in cleaners for alkaline earth metal salts, alkaline earth metal oxides and hydroxides, and silica and silicate salts for the purpose of making such cleaners more tolerant to hardness ions.

U.S. Pat. No. 4,375,254 describes a cleaner for silicates, colloidal clay and alkaline earth metal salts, particularly calcium carbonate, magnesium carbonate, calcium sulfate, barium sulfate and strontium sulfate. Such cleaners comprise 10–40% monobasic or dibasic sodium phosphate, 0–60% citric acid or 0–60% malic acid, and 0.1–5% of a nonionic surfactant. Total amount of citric and/or malic acid must be at least 20% and a suitable surfactant is a low-foaming nonionic surfactant, such as polyoxyethylene (12) tridecyl ether. Such cleaners are particularly effective in cleaning fouled reverse osmosis membranes.

The phosphates in the silicate cleaner compositions serve the dual purpose of cleaning as well as buffering the cleaning solution at a pH of about 2 to 4. The use of chelating agents, such as citric acid or malic acid, serves the dual function of dissolving alkali metal and alkaline earth metal salts, such as calcium and magnesium, and of preventing precipitation of phosphates caused by iron. The surfactant dissolves organic materials and emulsifies inorganic solids. It is necessary to remove and emulsify solids, such as colloidal materials, in order to expose the scale which can then be removed by other ingredients in the cleaner composition.

While monobasic and dibasic sodium phosphates can be used in or be a part of the silicate cleaners, the corresponding potassium phosphates can be substituted. In the past, phosphoric acid was used in place of the monobasic and dibasic alkali metal salts. Also, while the preferred compositions contain both citric and malic acids, such compositions are also effective with only one of these acids.

A cleaner composition which is particularly adapted for removal of silica/silicate scales is based on ammonium bifluoride and/or alkali metal bifluoride, such as sodium bifluoride. Silica/silicate scales include divalent cation scales such as calcium silicate and magnesium silicate and trivalent silicate scales such as ferric silicate and aluminum silicate. Such compositions contain 10 to 50% ammonium bifluoride ($NH_4HF_2$) or an alkali metal bifluoride such as sodium bifluoride, 15 to 55% citric and/or malic acid, 15 to 55% monosodium and/or disodium phosphate or phosphoric acid, and 0.1 to 2% surfactant. This composition can also be further modified by the addition of malic acid in place of or in addition to the citric acid, and oxalic acid for iron scale solubilization or inhibition.

The prior art cleaners which are effective against alkaline earth metal salts but are not effective against silica/silicate salts are devoid of monobasic and dibasic alkali metal phosphates, phosphoric acid, ammonium or alkali metal bifluoride. Such cleaners are particularly effective in solubilizing and inhibiting formation of scales such as calcium carbonate.

The cleaning compositions described above are primarily useful for cleaning reverse osmosis membranes in systems where there is little or no iron scale. In a system where there is a significant amount of iron scale, oxalic acid is also included in amount of 5–30%.

The cleaning compositions of this invention are intended for use at an acid pH of about 2 to 4. A composition to be used at high pH can be used to clean membranes fouled with fats, oils and other organic matter. In such a case, an anionic surfactant would be used since such surfactants are effective on oils or oily deposits.

Anionic or nonionic surfactants are suitable herein, although non-foaming or low-foaming nonionic surfactants are preferred. Mixtures of one or both can be used.

Typical low foaming nonionic detergents are well known in the art and generally comprise the class of compounds formed by condensation of an alkyl phenol, an alkyl amine, or an aliphatic compound having a polyoxyethylene chain within the molecule, i.e., a chain composed of recurring (—O—CH₂—CH₂—) groups. Many compounds of this type are known and used for their detergent, surface active, wetting and emulsifying properties. The detergents of this type which are useful in the present invention are those produced by condensation of about 4–16 moles of ethylene oxide with 1 mole of a compound selected from the group consisting of (1) alkyl phenols having about 1–15 carbon atoms in the alkyl group; (2) alkyl amines having about 10–20 carbon atoms in the alkyl group; (3) aliphatic alcohols having about 10–20 carbon atoms in their molecules; and (4) hydrophobic polymers formed by condensing propylene oxide with propylene glycol. The nonionic detergent used in the invention should have sufficient ethylene oxide units to insure solubility thereof in the detergent composition or in any dilution thereof which may be used in practice. Furthermore, the nonionic detergent used in this invention must be low- or non-foaming.

I have described above two kinds of cleaners: one which is particularly effective against alkaline earth metal scales such as calcium and magnesium scales, and one which is particularly effective against silica/silicate scales, such as silicates of calcium, magnesium, aluminum, and iron. The alkaline earth metal cleaners are also effective against metal oxides and hydroxides such as iron aluminum and manganese oxides and hydroxides. The cleaner composition which is particularly effective against alkaline earth metal scales and the oxide and hydroxide scales is based on at least one alkali metal phosphate and citric, malic, sulfamic acid, and/or oxalic acid whereas the cleaner composition which is particularly effective against silica/silicate scales, is based on ammonium or alkali metal bifluorides. For brevity, the first one will also be referred to hereinafter as an alkaline earth metal cleaner whereas the second one, as a silicate cleaner.

The problem with the known cleaners is their inability to produce desired results in the form of less deposition of organic and inorganic matter on semipermeable reverse osmosis membranes. Although the known cleaner compositions, which contain one or more weak organic acids such as citric acid, malic acid, oxalic acid, tartaric acid, ascorbic acid, and lactic acid, are effective in solubilizing alkaline earth metal scales and metal oxides and hydroxides, such compositions lose effectiveness after a time, about one-half hour or less since at low pH they start precipitating alkaline earth metal salts of citric acid, malic acid, oxalic acid and/or sulfamic acid, and other scales which are insoluble in water and which deposit on semipermeable membranes. Specific salts contemplated herein which can precipitate on a membrane include calcium citrate, calcium salts of malic acid, calcium oxalate, calcium sulfamate, and the like. This is an existing problem since it takes about one-half hour to one hour to clean a semipermeable membrane. In the case of silicate cleaners, alkaline earth metal bifluorides, such as calcium fluoride, are also formed which are insoluble in water and which can precipitate out on a semipermeable membrane.

The invention herein pertains to extending tolerance of the known cleaner compositions to precipitation of insoluble scales which deposit on semipermeable membranes. Since it takes at least one-half hour to one hour to clean a semipermeable membrane in a cleaning mode, precipitation of insoluble scales must be delayed or deferred at least one hour after the membrane is brought into contact with a cleaning composition.

It was discovered that the use of a phosphorus compound selected from phosphates and phosphonates with ingredients which characterize the alkaline earth metal cleaners and silicate cleaners can reduce or delay precipitation substantially and thus maintain salts in solution which would normally precipitate out in absence of such phosphorus compounds. Effectiveness of the cleaner compositions containing one or more of the phosphorus compounds is limited to the acid or low pH side below neutral pH of 7, preferably to pH of 2 to 4.

Suitable phosphorus compounds for inhibiting precipitation of scales include aminoalkyl, hydroxy alkyl phosphonic acids and phosphonates, phosphonalkanepolycarboxylic acids and salts thereof, polyphosphoric acids and salts thereof, and polyol phosphate esters. Particularly suitable herein are alkali metal salts of metaphosphoric acid, such as sodium hexametaphosphate, and aminoalkyl phosphonic acids and hydroxyalkyl diphosphonic acids and salts thereof.

Certain organophosphorous compounds, such as aminoalkyl phosphonic acids, N-substituted aminomethylene phosphonic acids, and both N- and C-substituted aminomethylene phosphonic acids, can be employed as the phosphorus compounds in membrane cleaning compositions. These compounds can be prepared pursuant to the disolosure of U.S. Pat. No. 3,288,846. Generally, such compounds can be characterized as containing at least one N-C-P linkage in their molecules, and have the following structural formula:

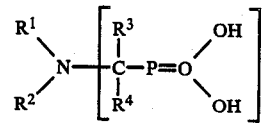

wherein $R^3$ and $R^4$ are individually selected from hydrogen and organic radicals, preferably hydrogen; $R^1$ and $R^2$ are individually selected from hydrogen, organic radicals, and alkylene phosphonic radicals, such as are within the brackets, above. Salts of the above compounds can also be used. Examples of this group of compounds include aminotri(methylene phosphonic acid), potassium salt of hexamethylenediamine tetra(methylene phosphonic acid), diethylenetriamine penta (methylene phosphonic acid) and polyhexylene polyamine polymethylene phosphonic acid.

The hydroxyalkyl -1, 1-diphosphonic acids described in U.S. Pat. No. Re. 28,553 are useful herein. Preferred compounds in this group are defined by the following structural formula:

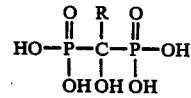

wherein R is a lower alkyl radical of 1 to 5 carbon atoms. The OH groups can be in esterified and two or more molecules can be converted to corresponding anhydrides. An especially useful compound in this group is 1 - hydroxyethane -1, 1- diphosphonic acid, also referred to as HEDP.

Certain of the phosphono alkanepolycarboxylic acids disclosed in U.S. Pat. No. 3,886,205 can be used as the phosphorus compounds referred to herein. These compounds are generally defined as follows:

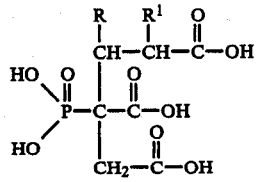

wherein R can be hydrogen, lower alkyl of 1 to 5 carbons, or carboxyl and $R^1$ can be hydrogen or methyl. Alkali metal, ammonium or amine salts of the above compounds are also suitable. These compounds can also be characterized as phosphonoalkane di- and tricarboxylic acids containing 2 to 6 carbon atoms in the alkane group. The above compounds have a strong complex-forming effect on alkaline earth metal ions. An especially effective compound in this group is 2-phosphonobutale-1, 2, 4-tricarboxylic acid.

Useful polyphosphoric acid compounds or polyphosphates are also disclosed by U.S. Pat. No. 2,358,222. This group of compounds include pyrophosphates, metaphosphates, and complex phosphates. The polyphosphates, such as pyrophosphates, triphosphate, tetraphosphate, hexametaphosphate, and complex phosphates, are generally derived by molecular dehydration of orthophosphoric acid compounds.

Useful polyolphosphates contain one or more 2-hydroxyethyl groups and one or more of the following groups:

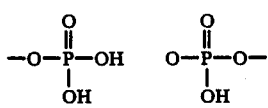

and salts thereof. Preparation of such compounds is disclosed in U.S. Pat. No. 3,462,365, of which, glycerine phosphate esters are preferred. Also included in this group of compounds are the phosphated mixed esters of non-surface active polyols containing at least one hydroxyethyl group and monohydric surface active compounds containing oxyethylene groups, described in U.S. Pat. No. 3,723,420.

The amino phosphonates useful herein are defined as follows:

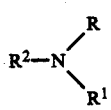

where R is

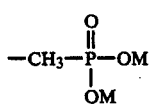

and $R^1$ is R or $-CH_2CH_2OH$ and $R^2$ is R, $-CH_2CH_2OH$ or

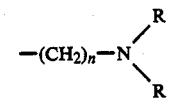

where M is H, $NH_4$, alkali metal, or a combination thereof, and n is 1 to 6. Such compounds are described in U.S. Pat. No. 3,336,221. Other useful amino phosphonates are described in U.S. Pat. No. 3,434,969.

Amount of the phosphorus compound used in the cleaning compositions described herein can vary from 0.5 to 70%, preferably 2 to 40%, based on the weight of the entire composition. Representative silicate cleaner compositions of this invention are illustrated below in weight percent:

|  | Broad Range | Preferred Range |
| --- | --- | --- |
| Ammonium Bifluoride | 1–60 | 5–50 |
| Citric Acid and/or Malic Acid | 0–60 | 2–40 |
| Phosphorus Compound | 0.5–70 | 2–40 |
| Surfactant | 0–2 | 0.1–1 |
|  | 100.0% | 100.0% |

Representative alkaline earth metal cleaner compositions of this invention are illustrated below, in weight percent:

|  | Broad Range | Preferred Range |
| --- | --- | --- |
| Citric Acid and/or Oxalic Acid | 10–99 | 20–60 |
| Phosphorus Compound | 0.5–70 | 2–40 |
| Surfactant | 0–2 | 0.1–1 |
|  | 100.0% | 100.0% |

The above cleaning compositions can include different phosphorus compounds: SHMP, which designates sodium hexamethaphosphate, and the phosphonate compound, which designates aminotri (methylene phosphonic acid) or Dequest ® 2000, available from Monsanto Comapny. Dequest ® 2000 is in a liquid form and is, for that reason, used to prepare a liquid cleaning composition.

The cleaning compositions can be shipped in concentrated forms, whether solid or liquid, and then diluted with water at the site of use. Cleaning compositions ready for use are normally liquid. Such compositions diluted in water to the extent of 2–5% concentration, can be used in recirculating water streams to clean semipermeable membranes. Also, such cleaning compositions can be added to the infeed stream in amount of 0.1 to 5000 ppm, preferably 1–50 ppm, so that the treated water can be passed through the semipermeable membrane and thus keep foulants to a minimum whereby cleaning of the membrane would be needed less frequently.

The invention is more specifically demonstrated by examples which follow.

EXAMPLE I

This example demonstrates the use of a phosphorus compound in a silicate cleaner where the primary ingredient was ammonium bifluoride ($NH_4HF_2$).

Experiments were conducted by dissolving 0.60 grams of ammonium bifluoride in 50 ml of distilled water containing 0–0.70 gram citric acid, and 0–0.7 gram of various phosphorus compounds, as given in Table A. To this cleaner composition was then added dropwise and with continuous stirring, dilute (0.1M) calcium solution. The onset of turbidity was monitored with a fiber optic probe connected to colorimeter (PC-1000 Brinkman).

Results of the experiments are given in Table A, below, where certain of the phosphorus compounds show a higher calcium ion tolerance, which is translated into improved protection against precipitation of calcium fluoride. Calcium fluoride, as noted earlier, is insoluble in water and would normally settle-out on a semipermeable membrane in a reverse osmosis system if a cleaner were used without the phosphorus compound.

TABLE A

| EXP. NO. | NH₄HF₂ (g) | CITRIC ACID (g) | PHOSPHATE (g) | | | Ca TOLERANCE (ppm) |
|---|---|---|---|---|---|---|
| | | | MSP | SHMP | STPP | |
| 1 | 0.60 | — | — | — | — | 38 |
| 2 | 0.60 | — | — | 0.01 | — | 55 |
| 3 | 0.60 | — | — | 0.025 | — | 82 |
| 4 | 0.60 | — | — | 0.10 | — | 133 |
| 5 | 0.60 | — | — | 0.25 | — | 240 |
| 6 | 0.60 | — | — | 0.50 | — | >350 |
| 7 | — | 0.69 | — | — | — | >350 |
| 8 | 0.60 | 0.69 | — | — | — | 40 |
| 9 | 0.60 | 0.69 | — | 0.01 | — | 100 |
| 10 | 0.60 | 0.69 | — | 0.10 | — | 160 |
| 11 | 0.60 | 0.69 | — | 0.30 | — | 280 |
| 12 | 0.60 | 0.69 | — | 0.50 | — | >350 |
| 13 | 0.60 | 0.69 | 0.68 | — | — | 40 |
| 14 | 0.60 | 0.69 | 0.68 | 0.01 | — | 100 |
| 15 | 0.60 | 0.69 | — | — | -.50 | 48 |

In the above Table A, MSP represents monosodium phosphate, SHMP represents sodium hexametaphosphate, and STPP represents sodium tripolyphosphate.

Results in Exp. 1 in Table A show that with 0.60 gram of ammonium bifluoride in solution, only 38 ppm of calcium ions was maintained in solution. When 0.01 gram of sodium hexametaphosphate was added along with 0.60 gram of ammonium bifluoride in Exp. 2, amount of solubilized calcium increased to 55 ppm which increased to in excess of 350 ppm on addition of 0.50 gram of sodium hexametaphosphate. Exp. 7 shows that 0.69 gram of citric acid alone can solubilize in excess of 350 ppm of calcium, however, it should be remembered that in silcate cleaner compositions, ammonium or an alkali metal bifluoride is also employed to solubilize the silicate scales. In Exp. 8, where ammonium bifluoride was used with citric acid, only 40 ppm of calcium was maintained in solution. It appears that ammonium bifluoride has an adverse affect on calcium tolerance. In Exp. 9, where the use of ammonium bifluoride, citric acid and 0.01 gram of sodium hexametaphosphate is demonstrated, amount of calcium maintained in solution was increased to 100 ppm due to the presence of sodium hexametaphosphate which increased to above 350 when amount of SHMP was increased to 0.050, see Exp. 12. In Exp. 13, relative ineffectiveness of 0.68 gram of monosodium phosphate is shown with ammonium bifluoride and citric acid, the two principal ingredients of silicate cleaners. Relative ineffectiveness of sodium tripolyphosphate is demonstrated in Exp. 15. Exp. 14 demonstrates the salutary effect of sodium hexametaphosphate on cleaners containing ammonium bifluoride, citric acid, and monosodium phosphate.

EXAMPLE II

The experiments in this example demonstrate effectiveness of phosphonates in silicate cleaners for improving tolerance to calcium ions. Such cleaners are characterized by the presence of ammonium bifluoride or an alkali metal bifluoride, such as sodium bifluoride, which solubilize silica and silicate salts. Results of these tests are given in Table B, below, where experimental procedures was the same as that in Ex. I.

TABLE B

| EXP. NO. | NH₄HF₂ (g) | CITRIC ACID (g) | PHOSPHONATES (g) | | | | | | Ca TOLERANCE (ppm) |
|---|---|---|---|---|---|---|---|---|---|
| | | | A | B | C | D | E | F | |
| 1 | 0.60 | 0.69 | — | — | — | — | — | — | 40 |
| 2 | 0.60 | 0.69 | 0.50 | — | — | — | — | — | 200 |
| 3 | 0.60 | 0.69 | — | .15 | — | — | — | — | 300 |
| 4 | 0.60 | 0.69 | — | .25 | — | — | — | — | >350 |
| 5 | 0.60 | 0.69 | — | .50 | — | — | — | — | >350 |
| 6 | 0.60 | 0.69 | — | — | .25 | — | — | — | >350 |
| 7 | 0.60 | 0.69 | — | — | — | .50 | — | — | 40 |
| 8 | 0.60 | 0.69 | — | — | — | — | .50 | — | 80 |
| 9 | 0.60 | 0.69 | — | — | — | — | — | .50 | 70 |

The following designations appear in the above table:

A=Dequest-2000, amino tris methylene phosphonic acid (Monsanto)

B=Dequest-2010, 1-hydroxyethane 1,1-diphosphonic acid (Monsanto)

C=Lonza-106, 1-hydroxyethane 1,1-diphosphonic acid (Lonza)

D=Lonza-905, diethylenetriamine penta (methylene phosphonic acid) (Lonza)

E=Lonza-1704, polyhexylene polyamine polymethylene phosphonic acid (Lonza)

F=Bayhibit-AM, 2-phosphono-1,2,4 - butane tricarboxylic acid (Mobay)

The above results show that without any phosphonates, calcium tolerance was only 40 ppm, which means that only 40 ppm of calcium ions were solubilized by the composition. This increased substantially when the various phosphonates were added. The best results were obtained with Dequest-2010 at a level of 0.25 gram. With 0.50 gram of Lonza-905 phosphonate, only 40 ppm calcium tolerance was attained, which is about the same as without any phosphonate.

EXAMPLE III

These experiments demonstrate effectiveness of certain additives in alkaline earth metal cleaners.

Here, experimental procedure at room temperature involved the addition of 0–0.5 gram of an additive scale inhibitor to 80 ml of distilled water. To this solution was then added 10 ml of 0.1M oxalic acid followed by dropwise addition of 10 ml of 0.1M calcium chloride. The solution was continually stirred at about 400 revolutions per minute with a teflon-coated stirring bar. During each experiment, the time to onset of turbidity or the start of calcium oxalate precipitation, was noted. Results of the experiments, which were carried out at pH of 2, are set forth in Table C, below:

TABLE C

| Exp. No. | Additive | Dosage (ppm) | Oxalic acid (0.1M, ml) | CaCl₂ (0.1M, me) | Time To Precipitate |
|---|---|---|---|---|---|
| 1 | None | — | 10 | 10 | 15 sec. |
| 2 | NaH₂PO₄ | 500 | 10 | 10 | 15 sec. |
| 3 | STPP | 500 | 10 | 10 | 15 sec. |
| 4 | SHMP | 10 | 10 | 10 | 30 sec. |
| 5 | SHMP | 100 | 10 | 10 | 15 min. |
| 6 | SHMP | 500 | 10 | 10 | 22 min. |
| 7 | SHMP | 1,000 | 10 | 10 | 60 min. |
| 8 | SHMP | 1,500 | 10 | 10 | 90 min. |
| 9 | SHMP | 2,000 | 10 | 10 | 90 min. |
| 10 | SHMP | 2,500 | 10 | 10 | >180 min. |
| 11 | SHMP | 5,000 | 10 | 10 | >180 min. |
| 12 | SHMP | 1,000 | — | 10 | >180 min. |
| 13 | SHMP | 1,000 | 10 | — | >180 min. |

In the above Table C, the following contractions appear:
NaH₂PO₄—sodium dihydrogenphosphate
STPP—sodium tripolyphosphate
SHMP—sodium hexameterphosphate Results in Table C indicate that sodium dihydrogen phosphate and sodium tripolyphosphate are not effective in raising calcium toolerance at the level of 500 ppm in an alkaline earth metal cleaner which is characterized by the presence of oxalic acid. Effect of sodium hexametaphosphate is evident from its addition of 10 to 5,000 ppm which increased time to precipitation from 30 seconds at 10 ppm level to over 180 minutes at 5,000 ppm level, in the presence of oxalic acid and calcium chloride. In absence of oxalic acid, the presence of 1,000 ppm of sodium hexametaphosphate increased time to precipitation to over 180 minutes. The same result was obtained with oxalic acid but in absence of calcium chloride, at the same level of 1,000 ppm of sodium hexametaphosphate.

EXAMPLE IV

Same procedure as in Example III was used to evaluate phosphonates as additives to cleaners of alkaline earth scales metal to increase tolerance or solubilization of calcium ions. Results are given in Table D, below:

TABLE D

| Inhibitor | Dosage (ppm) | Oxalic Acid (0.1M, ml) | CaCl₂ (0.1M, ml) | Time to Precipitate |
|---|---|---|---|---|
| Control | — | 10 | 10 | 15 sec. |
| Dequest-2000 | 2,500 | 10 | 10 | <2 min. |
| Dequest-2010 | 2,500 | 10 | 10 | <2 min. |
| Dequest-2010 | 5,000 | 10 | 10 | <2 min. |
| Lonza-905 | 2,500 | 10 | 10 | 7 min. |
| Lonza-905 | 5,000 | 10 | 10 | >180 min. |
| Lonza-1704 | 2,500 | 10 | 10 | 1 min. |
| Lonza-1704 | 5,000 | 10 | 10 | 2 min. |
| Bayhibit-AM | 2,500 | 10 | 10 | 2 min. |

The following contractions appear in the above Table D.

Dequest-2000=amino trismethylene (phosphonic acid) (Monsanto)
Dequest-2010=1-hydroxyethane-1,1-diphosphonic acid (Monanto)
Lonza-905=Diethylenetriamine penta (methylene phosphonic acid) (Lonza)
Lonza-1704=polyhexylene polyamine polymethylene phosphonic acid (Lonza)
Bayhibit-AM=2-phosphonobutane-1,2,4 -tricarboxylic acid (Mobay)

Results in Table D, above, demonstrate relative effectiveness of the various phosphonates that were evaluated. Although Dequest-2000 and Dequest-2010 phosphonates gave time to precipitation of less than 2 minutes at a level of 2,500–5,000 ppm, Lonza-905 phosphonate at the level of 2,500 ppm gave time to precipitation of about 7 minutes which increased to in excess of 180 minutes when amount of Lonza-905 phosphonate was increased to 5,000 ppm with ml of 0.1M solutions of oxalic acid and calcium chloride. Lonza-1704 and Bayhibit-AM phosphonates yielded lower results.

EXAMPLE V

These experiments demonstrate effectiveness of certain additives in alkaline earth metal cleaners.

Here, experimental procedure at room temperature involved the addition of 3.0 grams of calcium carbonate in 100 ml of distilled water containing 0–5 grams of dissolving agent such as citric acid, malic acid, and the like, and 0–5 g of phosphorus additive. Amount of the dissolving agent or the phosphorus compound is based on the weight of 5 grams. The slurry was continuously stirred with a teflon-coated magnetic stirring bar. At known time, samples were withdrawn, filtered through 0.22 micron filter paper and the filtrate analyzed for calcium. The 3% phosphonate in Exp. 18 was Dequest-2000 or amino trismethylene (phosphonic acid), in Exp. 19 it was Dequest-2010 or 1-hydroxyethane-1,1-di-phosphonic acid, and in Exp. 20 it was 2-phosphonobutane-1,2,4-tricarboxylic acid. Results are given in Table E. below:

TABLE E

| Exp. No. | Dissolving Agent Composition (%) | | | | | | | Ca (ppm) × 100 Time (Min) | | | |
|---|---|---|---|---|---|---|---|---|---|---|---|
| | CA | MA | SHMP | STPP | SPP | MSP/DSP | Phosphonate | 30 | 60 | 90 | 120 |
| 1 | 100 | 0 | 0 | 0 | 0 | 0 | 0 | 110 | 27 | 22 | 20 |
| 2 | 0 | 100 | 0 | 0 | 0 | 0 | 0 | 115 | 113 | 111 | 62 |
| 3 | 0 | 0 | 100 | 0 | 0 | 0 | 0 | — | — | 14 | — |
| 4 | 99 | 0 | 1 | 0 | 0 | 0 | 0 | 103 | 108 | 89 | — |
| 5 | 95 | 0 | 5 | 0 | 0 | 0 | 0 | 87 | 92 | 101 | 98 |
| 6 | 80 | 0 | 20 | 0 | 0 | 0 | 0 | 51 | 62 | 75 | 74 |
| 7 | 50 | 0 | 50 | 0 | 0 | 0 | 0 | 41 | 40 | 55 | 50 |
| 8 | 90 | 0 | 0 | 10 | 0 | 0 | 0 | — | — | 73 | — |
| 9 | 50 | 0 | 0 | 50 | 0 | 0 | 0 | — | — | 17 | — |
| 10 | 31 | 25 | 0 | 44 | 0 | 0 | 0 | — | — | 29 | — |

TABLE E-continued

| No. Exp. | Dissolving Agent Composition (%) | | | | | | | Ca (ppm) × 100 Time (Min) | | | |
|---|---|---|---|---|---|---|---|---|---|---|---|
| | CA | MA | SHMP | STPP | SPP | MSP/DSP | Phosphonate | 30 | 60 | 90 | 120 |
| 11 | 31 | 25 | 44 | 0 | 0 | 0 | 0 | — | — | 49 | — |
| 12 | 31 | 25 | 0 | 0 | 44 | 0 | 0 | — | — | 33 | — |
| 13 | 31 | 25 | 0 | 0 | 0 | 44 | 0 | — | — | 63 | — |
| 14 | 97 | 0 | 3 | 0 | 0 | 0 | 0 | 100 | 100 | 104 | — |
| 15 | 97 | 0 | 0 | 3 | 0 | 0 | 0 | — | — | 67 | — |
| 16 | 97 | 0 | 0 | 0 | 3 | 0 | 0 | — | — | 43 | — |
| 17 | 97 | 0 | 0 | 0 | 0 | 3 | 0 | — | — | 20 | — |
| 18 | 97 | 0 | 0 | 0 | 0 | 0 | 3 | — | 101 | 56 | — |
| 19 | 97 | 0 | 0 | 0 | 0 | 0 | 3 | — | 86 | — | — |
| 20 | 97 | 0 | 0 | 0 | 0 | 0 | 3 | — | 83 | — | — |
| 21 | 0 | 97 | 3 | 0 | 0 | 0 | 0 | — | 86 | 90 | 92 |

The following contractions appear in Table E, above:
CA=citric acid
Ma=malic acid
SHMP=sodium hexametaphosphate
STPP=sodium tripolyphosphate
SPP=sodium pyrophosphate
MSP=monosodium phosphate
DSP=disodium phosphate Results presented in Table E demonstrate the effectiveness of phosphorus compounds to increase the tolerance of alkaline earth metal cleaner compositions for calcium ions. The use of the improved cleaner compositions inhibit precipitation of calcium salts of malic and citric acids. As data in Table E demonstrates, cleaner compositions devoid of a phosphorus compound would lead to precipitation of undesirable calcium salts of malic and citric acids in a relatively short period of time on the order of less than one hour.

The efficacy of the herein-described improved cleaner compositions has been confirmed by tests on semipermeable membranes fouled in commercial use.

I claim:

1. Composition for cleaning or for preventing fouling of a semipermeable membrane comprising 20-60% by weight of a weak organic acid selected from the group consisting of citric acid, malic acid, tartaric acid, ascorbic acid, lactic acid, oxalic acid, sulfamic acid and mixtures thereof; and 2-40% by weight phosphorus compound selected from the group consisting of alkali metal salts of metaphosphoric acid, amino alkyl phosphonic acids, hydroxyalkyl diphosphonic acids, aminoalkyl and hydroxyalkyl phosphonic acids and phosphonates, phosphonoalkanepolycarboxylic acids and salts thereof, polyphosphoric acids and salts thereof, polyol phosphate esters, and mixtures thereof; the amounts are based on the weight of the entire composition.

2. Composition of claim 1 wherein said weak organic acid is selected from the group consisting of citric acid, malic acid, oxalic acid, sulfamic acid, and mixtures thereof.

3. Composition of claim 2 wherein said phosphorus compound is selected from the group consisting of sodium hexametaphosphate, 1-hydroxyethane-1, 1-diphosphonic acid, amino tris methylene phosphonic acid, salts of such acids, and mixtures thereof.

4. Composition of claim 3 also including 0.1-1% by weight of a surfactant selected from the group consisting of anionic surfactants, nonionic surfactants, and mixtures thereof.

5. Composition for cleaning or for preventing fouling of a semipermeable membrane comprising 5-50% by weight of a bifluoride selected from the group consisting of ammonium bifluoride, alkali metal bifluorides, and mixtures thereof; 2-40% by weight of a weak organic acid selected from the group consisting of citric acid, malic acid, tartaric acid, ascorbic acid, lactic acid, oxalic acid sulfamic acid and mixtures thereof; and 2-40% by weight phosphorus compound selected from the group consisting of alkali metal salts of metaphosphoric acid, amino alkyl phosphonic acids, hydroxyalkyl diphosphonic acids, aminoalkyl and hydroxyalkyl phosphonic acids and phosphonates, phosphonoalkanepolycarboxylic acids and salts thereof, polyphosphoric acids and salts thereof, polyol phosphate esters, and mixtures thereof; the amounts are based on the weight of the entire composition.

6. Composition of claim 5 wherein said weak organic acid is selected from the group consisting of citric acid, malic acid, oxalic acid, sulfamic acid, and mixtures thereof.

7. Composition of claim 6 wherein said phosphorus compound is selected from the group consisting of sodium hexametaphosphate, 1-hydroxyethane-1, 1-diphosphonic acid, amino tris methylene phosphonic acid, salts of such acids, and mixtures thereof; and wherein said bifluoride is selected from the group consisting of ammonium bifluoride, sodium bifluoride, potassium bifluoride, and mixtures thereof.

8. Composition of claim 7 also including 0.1-1% by weight of a surfactant selected from the group consisting of anionic surfactants, nonionic surfactants, and mixtures thereof.

9. Composition of claim 8 wherein said bifluoride is ammonium bifluoride, wherein said weak organic acid is citric acid, and wherein said phosphorus compound is sodium hexametaphosphate.

10. Process for cleaning or for preventing fouling a semipermeable membrane in a water purification system wherein water is passed through said membrane, said process comprising the step of adding to water an effective amount for cleaning or for preventing fouling of said membrane a cleaner composition comprising 20-60% by weight of the entire composition of a weak organic acid selected from the group consisting of citric acid, malic acid, tartaric acid, ascorbic acid, lactic acid, oxalic acid, sulfamic acid and mixtures thereof; and 2-40% by weight of the entire composition of phosphorus compound selected from the group consisting of alkali metal salts of metaphosphoric acid, amino alkyl phosphonic acids, hydroxyalkyl diphosphonic acids, aminoalkyl and hydroxyalkyl phosphonic acids and phosphonates, phosphonoalkanepolycarboxylic acids and salts thereof, polyphosphoric acids and salts thereof, polyol phosphate esters, and mixtures thereof; and contacting said membrane with said water containing said composition.

11. Process of claim 10 wherein said weak organic acid is selected from the group consisting of citric acid, malic acid, oxalic acid, sulfamic acid, and mixtures thereof.

12. Process of claim 11 wherein said phosphorus compound is selected from the group consisting of sodium hexametaphosphate, 1-hydroxyethane-1, 1-diphosphonic acid, amino tris methylene phosphonic acid, salts of such acids, and mixtures thereof.

13. Process of claim 12 wherein cleaner composition also includes 0.1-1% by weight of a surfactant selected from the group consisting of anionic surfactants, nonionic surfactants, and mixtures thereof.

14. Process for cleaning or for preventing fouling a semipermeable membrane in a water purification system wherein water is passed through said membrane, said process comprising the step of adding to water an effective amount for cleaning or for preventing fouling of said membrane a cleaner composition comprising 5-50% by weight of the entire composition of a bifluoride selected from the group consisting of ammonium bifluoride, alkali metal bifluorides, and mixtures thereof; 2-40% by weight of the entire composition of a weak organic acid selected from the group consisting of citric acid, malic acid, tartaric acid, ascorbic acid, lactic acid, oxalic acid, sulfamic acid and mixtures thereof; and 2-40% by weight of the entire composition of phosphorus compound selected from the group consisting of alkali metal salts of metaphosphoric acid, amino alkyl phophonic acids, hydroxyalkyl diphosphonic acids, aminoalkyl and hydroxyalkyl phosphonic acids, and phosphonates, phosphonoalkanepolycarboxylic acids and salts thereof, polyol phosphate esters, and mixtures thereof; and contacting said membrane with said water containing said composition.

15. Process of claim 14 wherein said weak organic acid is selected from the group consisting of citric acid, malic acid, oxalic acid, sulfamic acid, and mixtures thereof.

16. Process of claim 15 wherein said phosphorus compound is selected from the group consisting of sodium hexametaphosphate, 1-hydroxyethane-1, 1-diphosphonic acid, amino tris methylene phosphonic acid, salts of such acids, and mixtures thereof.

17. Process of claim 15 wherein said cleaner composition also includes 0.1-1% by weight of a surfactant selected from the group consisting of anionic surfactants, nonionic surfactants, and mixtures thereof.

18. Process of claim 17 wherein said phosphorus compound is selected from the group consisting of sodium hexametaphosphate, 1-hydroxyethane-1, 1-diphosphonic acid, amino tris methylene phosphonic acid, salts of such acids, and mixtures thereof; and wherein said bifluoride is selected from the group consisting of ammonium bifluoride, sodium bifluoride, potassium bifluoride, and mixtures thereof.

19. Process of claim 17 wherein said bifluoride is ammonium bifluoride, wherein said weak organic acid is citric acid, and wherein said phosphorus compound is sodium hexametaphosphate.

* * * * *